United States Patent [19]
Lincoln et al.

[11] Patent Number: 5,985,505
[45] Date of Patent: Nov. 16, 1999

[54] PROCESSES FOR THE PREPARATION OF HYDROXYGALLIUM PHTHALOCYANINE

[75] Inventors: Paul C. Lincoln; Edouard E. Langlois, both of Rochester, N.Y.; Daniel M. McNeil, Georgetown, Canada

[73] Assignee: Xerox Corporation, Stamford, Conn.

[21] Appl. No.: 09/296,203

[22] Filed: Apr. 21, 1999

[51] Int. Cl.$^6$ ........................................ G03G 5/06
[52] U.S. Cl. .................................. 430/135; 540/141
[58] Field of Search .................... 430/78, 135; 540/140, 540/141

[56] References Cited

U.S. PATENT DOCUMENTS

| | | | |
|---|---|---|---|
| 5,302,479 | 4/1994 | Daimon et al. | 430/78 |
| 5,407,766 | 4/1995 | Mayo et al. | 430/58 |
| 5,459,004 | 10/1995 | Katsumi et al. | 430/78 |
| 5,463,041 | 10/1995 | Nukada et al. | 540/140 |
| 5,473,064 | 12/1995 | Mayo et al. | 540/141 |
| 5,521,306 | 5/1996 | Burt et al. | 540/141 |
| 5,556,967 | 9/1996 | Nukada et al. | 540/140 |
| 5,885,737 | 3/1999 | Tanaka | 540/141 |

*Primary Examiner*—Roland Martin
*Attorney, Agent, or Firm*—John L. Haack

[57] ABSTRACT

A process including mixing a slurry of HOGaPc Type I polymorph, under low shear and high flow, in an organic solvent, wherein there results a HOGaPc Type V polymorph with superior electrophotographic imaging properties.

15 Claims, No Drawings

PROCESSES FOR THE PREPARATION OF HYDROXYGALLIUM PHTHALOCYANINE

REFERENCE TO COPENDING AND ISSUED PATENTS

Attention is directed to commonly owned and assigned U.S. Pat. Nos. 5,473,064; 5,407,766; 5,756,245; 5,482,811; 5,407,766; 5,668,276; 5,587,262; 5,563,261; 5,521,306; 5,556,967; and 5,495,011 which patents disclose processes for the preparation of hydroxygallium phthalocyanine, for example, HOGaPc Type V polymorphs.

The disclosures of each the above mentioned patents are incorporated herein by reference in their entirety. The appropriate components and processes of these patents may be selected for the present invention in embodiments thereof.

BACKGROUND OF THE INVENTION

The present invention is generally directed to processes for the preparation of hydroxygallium phthalocyanine (HOGaPc) compounds and to imaging articles and imaging processes thereof. More specifically, the present invention is directed to processes for transforming hydroxygallium phthalocyanine a Type I polymorph into a Type V polymorph, to imaging articles containing the Type V polymorph, such as a photoreceptor, and to imaging processes and apparatus using the imaging articles.

Problems associated with prior art polymorph interconversions include: (1) scalability limitations of roll-milling processes that are manifested in the inability to manufacture and handle milling vessels at sizes, for example, of and above about 50 to about 100 gallons; and (2) production of Type V hydroxygallium phthalocyanine that possesses photosensitivity properties inferior to those of material transformed to the Type V polymorph by the roll-milling process. Other operational and logistical problems include: potential operator exposure to solvent vapors during bead separation and slurry transfer sequences of the conventional roll-milling process.

The aforementioned problems are unsatisfactory and are overcome in the present invention.

The processes and articles containing the product of the processes of the present invention are useful in many electrostatographic applications, for example, in xerographic printers and copiers, and especially in color xerographic systems.

PRIOR ART

U.S. Pat. No. 5,407,766, issued Apr, 18, 1995, to Mayo et al., discloses a process for the preparation of hydroxygallium phthalocyanine and elements containing same which comprises the synthesis of a precursor halogallium phthalocyanine by the reaction of a diiminoisoindolene with gallium acetylacetonate; hydrolysis thereof to hydroxygallium phthalocyanine; and conversion of the resulting hydroxygallium phthalocyanine obtained to Type V hydroxygallium phthalocyanine by contacting said resulting hydroxygallium phthalocyanine with an organic solvent.

U.S. Pat. No. 5,521,306, issued May 28, 1996, to Burt et al., discloses a process for the preparation of Type V hydroxygallium phthalocyanine which comprises the in situ formation of an alkoxy-bridged gallium phthalocyanine dimer, hydrolyzing the alkoxy-bridged gallium phthalocyanine dimer to hydroxygallium phthalocyanine, and subsequently converting the hydroxygallium phthalocyanine product obtained to Type V hydroxygallium phthalocyanine.

U.S. Pat. No. 5,459,004, issued Oct. 17, 1995, to Daimon et al., discloses a process for preparing hydroxygallium phthalocyanine crystals showing intense diffraction peaks at Bragg angles (2.theta.±0.2) of 7.5°, 25.1°, and 28.3° with respect to CuK.alpha. characteristic X-rays which comprises mechanically grinding hydroxygallium phthalocyanine and then treating the grains with a solvent. The hydroxygallium phthalocyanine crystals obtained have a novel crystal form and exhibits high sensitivity and excellent durability on repeated use as well as crystal form stability. The electrophotographic photoreceptor prepared by using the resulting hydroxygallium phthalocyanine exhibits excellent electrophotographic characteristics.

U.S. Pat. No. 5,302,479, issued Apr. 12, 1994, to Daimon et al., discloses crystals of hydroxygallium phthalocyanine, a method of preparing the crystals, a photoconductive material containing the crystals, and an electrophotographic photoreceptor having the material. The photoreceptor has excellent electrophotographic characteristics. The crystals of hydroxygallium phthalocyanine have distinct diffraction peaks at (i) 7.5°, 9.9°, 12.5°, 16.3°, 18.6°, 25.1° and 28.3°, or (ii) 7.7°, 16.5°, 25.1° and 26.6°, or (iii) 7.9°, 16.5°, 24.4° and 27.6°, or (iv) 7.0°, 7.5°, 10.5°, 11.7°, 12.7°, 17.3°, 8.1°, 24.5°, 26.2° and 27.1°, or (v) 6.8°, 12.8°, 15.8° and 26.0° or (vi) 7.4°, 9.9°, 25.0°, 26.0°, and 28.2° of the Bragg angle (2.theta.±0.2) in the X-ray diffraction spectrum. The electrophotographic photoreceptor has a light-sensitive layer containing the photoconductive material of the crystals.

The disclosures of each of the above mentioned patents are incorporated herein by reference in their entirety.

SUMMARY OF THE INVENTION

Embodiments of the present invention, include:

Processes for the preparation of HOGaPc Type V polymorph comprising controlled mixing of a slurry of HOGaPc Type I polymorph in an organic solvent;

An imaging member including a HOGaPc Type V polymorph prepared in accordance with the aforementioned processes; and A printing machine including the aforementioned imaging member.

These and other embodiments are illustrated herein.

DETAILED DESCRIPTION OF THE INVENTION

The present invention in embodiments provides preparative processes comprising mixing a slurry of HOGaPc Type I polymorph under low shear and high flow conditions in an organic solvent, wherein there results a HOGaPc Type V polymorph. More specifically, the present invention provides a process for the preparation of HOGaPc Type V polymorph by, for example, mixing a slurry of HOGaPc Type I polymorph at a concentration of about 6 weight percent in N,N-dimethylformamide for about 96 hours. The resulting HOGaPc Type V polymorph product quality and electrophotographic performance properties were under selected conditions found to be superior to conventional preparative processes. The product quality was unexpectedly found to depend substantially upon mixing conditions and processing logistics.

Preferred product quality and properties were achieved with mixing conditions that included: 1) using an anchor impeller type mixer element; 2) at a mix speed that provided an anchor impeller tip velocity of about 0.2 to about 0.3 meter per second; and 3) adapting the size of the impeller diameter (D) and tank diameter (T) such that the ratio of the diameters (D/T) is from about 0.8 to about 0.99.

The mixing is preferably accomplished in a mix tank where the ratio(D/T) of the impeller diameter (D) to the tank diameter (T) is about from about 0.8 to about 0.99, and preferably from about 0.85 to about 0.99, and more preferably from about 0.94 to about 0.96. The mixing is accomplished at a mix speed which provides an anchor impeller tip velocity of from about 0.200 to about 0.300 meter per second, preferably from about 0.220 to about 0.250 meter per second, and more preferably from about 0.225 to about 0.226 meter per second.

The electrical properties of the resulting HOGaPc Type V polymorph include:

an $E_{1/2}$ of from about 1.53 to about 1.84, and preferably from about 1.66 to about 1.71 ergs/cm; an $E_{7/8}$ of from about 2.95 to about 4.19, and preferably from about 3.54 to about 3.64 ergs/cm$^2$, a residual voltage of from about 0.56 to about 6.34, and preferably about 3 to about 4 Volts; and a dark decay of less than about 35 Volts at 500 milliseconds squared, and preferably from about 23 to about 25 V at 500 milliseconds squared.

The slurry of HOGaPc and solvent can be comprised of from about 2 to about 10 weight percent HOGaPc Type I polymorph based on the combined weight of the Type I polymorph and the solvent, preferably from about 4 to about 8 weight percent HOGaPc, and more preferably from about 5.5 to about 6.5 weight percent based on the combined weight of the HOGaPc Type I polymorph and the solvent.

The organic solvent can be, for example, N,N-dimethylformamide, pyridine, dimethylsulfoxide, quinoline, 1-chloronaphthalene, N-methylpyrrolidone, and mixtures thereof. A preferred organic solvent is N,N-dimethylformamide (DMF).

The mixing is preferably accomplished under low shear and high flow conditions, for example, a low average shear condition of from about 20 seconds$^{-1}$ to about 30 seconds$^{-1}$, and a high axial flow condition of from about 3.1 liters/second to about 4.6 liters/second at the 10L scale, or alternatively, of from about 31% to about 46% of reactor volume per second.

The mixing of the slurry in accordance with the present invention can be accomplished, for example, in from about 10 to about 120 hours, preferably in from about 90 to about 100 hours, and more preferably from about 92 to about 98 hours. The temperature of the mixing can be accomplished at about 0° C. to about 100° C., a preferred temperature is from about 18° C. to about 25° C., and a more preferred temperature is at about 20° C. to about 23° C.

The preparative processes of the present invention can further comprise washing the hydroxygallium Type V polymorph product with a wash solvent, such as acetone, an aliphatic alcohol, and mixtures thereof, and wherein aliphatic alcohol, for example, methanol, ethanol, butanol, pentanol, and the like alcohols, contains, for example, from 1 to about 25 carbon atoms.

In a preferred embodiment the present invention provides a process comprising: mixing with an anchor impeller a slurry of from about 5.5 to about 6.5 weight percent based on the total weight of the slurry of HOGaPc Type I polymorph in N,N-dimethylformamide, wherein there results a HOGaPc Type V polymorph. The tip velocity of the anchor impeller is from about 0.20 to about 0.30 meters per second. The mixing is accomplished in a mix tank with a ratio(D/T) of the impeller (D) diameter to the tank (T) diameter of from about 0.9 to about 0.99. The electrical properties of the resulting HOGaPc Type V polymorph include: an $E_{1/2}$ of from about 1.66 to about 1.71 ergs/cm$^2$; an $E_{7/8}$ of from about 3.54 to about 3.64 ergs/cm$^2$; a residual voltage of from about 3 to about 4 Volts; and a dark decay of from about 23 to about 25 Volts at 500 milliseconds squared. The resulting HOGaPc Type V polymorph product has major peaks at 7.4, 9.8, 12.4, 16.2, 17.6, 18.4, 21.9, 23.9, 25.0, 28.1 and with the highest peak at 7.4 degrees 2.THETA.

In embodiments, the present invention provides an imaging member including a HOGaPc Type V polymorph prepared in accordance with the aforementioned preparative processes.

In other embodiments, the present invention provides a printing machine incorporating the aforementioned imaging member which imaging member includes the aforementioned HOGaPc Type V polymorph.

Advantages of the present invention and as illustrated herein include: scalability of the process to larger volumes that are impractical at smaller scales and that avoid conventional production process hold-ups; permitting selection of process equipment that enables the process to be conducted at large scales, such as from about 100 to about 400 gallons, and above; providing a method to produce Type V HOGaPc crystals with properties suitable for use in photoreceptors and which photoreceptors possess superior electrophotographic characteristics; and avoiding and controlling operator exposure to organic solvents and pigment powders.

The invention will further be illustrated in the following nonlimiting Examples, it being understood that these Examples are intended to be illustrative only and that the invention is not intended to be limited to the materials, conditions, process parameters, and the like, recited herein. Parts and percentages are by weight unless otherwise indicated.

EXAMPLE I

Conversion of Hydroxygallium Phthalocyanine Type I Polymorph To Type V Polymoroh—With Low Shear and High Flow Stirred Conversion A slurry of Type I HOGaPc, obtained from Comparative Example I, was prepared by adding 1 parts by weight of Type I hydroxygallium phthalocyanine to 15.7 weight parts N,N-dimethylformamide (DMF) in a stainless steel vessel at room temperature, between 18° C. and 25° C., under an inert atmosphere of nitrogen. The slurry was then mixed with an anchor-shaped impeller with a diameter which is about 95 percent of the vessel's diameter, at a speed that provides a tip velocity of about 0.23 meter per second, for about 96 hours. The resulting slurry of Type V HOGaPc and DMF was pumped to a stainless steel filter fitted with GORTEX™ filtration media, where it was filtered under about 100 Kpa to about 200 Kpa of nitrogen pressure at a temperature of between 18° C. and 25° C. Next, about 0.79 parts by weight of acetone, at room temperature, was added to the conversion vessel, mixed, and pumped to the filter, where an additional 7.11 parts of acetone were added and filtered under 100 to 200 Kpa of nitrogen pressure at room temperature. Two additional acetone washes of 7.90 weight parts were added directly to the filter and filtered under the aforementioned conditions. The resulting wet HOGaPc Type V cake was dried in the filter at about 60° C., in-vacuo at a pressure between –90 Kpa and –98 Kpa, for about 48 hours. The Type V hydroxygallium phthalocyanine polymorph obtained had an X-ray diffraction pattern having major peaks at Bragg angles at 7.4, 9.8, 12.4, 12.9, 16.2, 18.4, 21.9, 23.9, 25.0, and 28.1, with the highest peak at 7.4 degrees 2.THETA (2 theta .+-. 0.2 degree). Table 1 contains examples of electrophotographic properties of photoconductors prepared from the Type V hydroxygallium phthalocyanine isolated from the present process, samples 1–3, and a reference material prepared by roll mill processing. The results for samples 1–3 in Table 1 are to be compared with the results for comparative preparative methods contained in Tables 2 to 4. Plots of the $E_{1/2}$ and $E_{7/8}$ values versus the tip velocity of the anchor-shaped impeller shows a dramatic and unexpected E minimums in the range of about 0.2 to about 0.3 meters per second. The tip velocity and its relation to low average shear and high flow is believed to be responsible for the superior (lower) E values obtained for the HOGaPc Type V obtained in the present process.

TABLE 1

Electrophotographic Properties of Photoconductors Prepared From HOGaPc Type V Pigments By Low Shear - High Flow Conditions.

| Sample | Dark Decay (-V) @ 500 ms$^2$ | E1/2 (ergs/cm$^2$) | E7/8 (ergs/cm$^2$) | Vr (avg.) (-V) | λ max (nm) | Comments |
|---|---|---|---|---|---|---|
| 1 | 15.1 | 1.71 | 3.64 | 3 | 839/840 | 10 L scale |
| 2 | 14.1 | 1.68 | 3.62 | 3 | 838/839 | 10 L scale |
| 3 | 23.0 | 1.66 | 3.54 | 4 | 843/844 | 10 L scale |
| Reference | 21.1 | 1.62 | 3.38 | 3 | 832/832 | Roll-Mill |
| Target Spec. | <35 | 1.53–1.84 | 2.95–4.19 | 0.56–6.34 | — | |

COMPARATIVE EXAMPLE I

Preparation Of Hydroxygallium Phthalocyanine Type I

In accordance with the aforementioned U.S Pat. No. 5,521,306, an alkoxy-bridged gallium phthalocyanine dimer (1 parts by weight) is dissolved in concentrated sulfuric acid, about 95 percent, in an amount of from about 1 parts by weight to about 100 parts by weight, and in an embodiment about 25 parts by weight, by stirring the pigment in the acid for an effective period of time, from about one minute to about 24 hours, and in an embodiment about 2 hours, at a temperature of from about 0° C. to about 75° C., and preferably about 40° C.in air or under an inert atmosphere, such as argon or nitrogen; adding the resulting mixture at a controlled rate to a stirred solvent, such as water or a basic aqueous solution, such as an aqueous ammonia solution of from about 3 molar to about 15 molar concentration, and preferably about 6 to about 10 molar concentration, selecting from about 1 volume part to about 10 volume parts of the basic solution for each volume part of sulfuric acid that was used such that at the end of the precipitation step the pH of the pigment suspension is above about 7, and which solvent is chilled while being stirred, in order to maintain a temperature from about −5° C. to about 40° C. during the pigment precipitation; isolating the resulting blue pigment by, for example, filtration, and washing the hydroxygallium phthalocyanine product obtained with deionized water by, for example, repeatedly redispersing and filtering the pigment until the filtrate is of neutral pH. The product is a dark blue solid with an X-ray diffraction pattern having major peaks at Bragg angles of 6.8, 13.0, 16.5, 21.0, 26.3, and 29.5, with the highest peak at 6.8 degrees 2 THETA. (2 theta. +−0.2 degree.), is identified as Type I hydroxygallium phthalocyanine by comparison with an authentic sample.

COMPARATIVE EXAMPLE II

Preparation of Hydroxyycallium Phthalocyanine Type V—Roll-Mill Conversion

Type I hydroxygallium phthalocyanine product obtained from preparative Comparative Example I is treated with a polar aprotic solvent, such as N,N dimethylformamide, N-methylpyrrolidone, and the like, by, for example, ball milling the Type I hydroxygallium phthalocyanine pigment in the presence of spherical glass beads, approximately 1 millimeter to 6 millimeters in diameter, at about 25° C. for about 1 hour to about 1 week, and preferably about 1 to about 24 hours. The resulting slurry of Type V HOGaPc and DMF was isolated as in Example I above, wherein there is obtained a Type V hydroxygallium phthalocyanine with an X-ray diffraction pattern having major peaks at Bragg angles 7.4, 9.8, 12.4, 12.9, 16.2, 18.4, 21.9, 23.9, 25.0, and 28.1 with the highest peak at 7.4 degrees 2 THETA. (2 theta .+−. 0.2 degree).

COMPARATIVE EXAMPLE III

Conversion of HOGaPc Type I Polymorgh to Type V Polymoroh–High Shear Homogenizer This comparative process for conversion of HOGaPc Type I to Type V polymorph comprises forming a slurry by adding 1 parts by weight Type I to 15.7 weight parts N,N-dimethylformamide (DMF) in a stainless steel vessel at room temperature, between 18° C. and 25° C., under an inert atmosphere of nitrogen. The slurry is drawn through a high-shear homogenizer, connected at the top of the vessel, and returned to the vessel for a period of 24 to 72 hours. The resulting slurry of Type V HOGaPc and DMF was isolated as in Example I above.

Table 2 contains examples of electrophotographic properties of photoconductors prepared from the resulting Type V hydroxygallium phthalocyanine converted using high shear homogenization.

TABLE 2

Type V HOGaPC Prepared Using High Shear Homogenization.

| Comparative Sample | Dark Decay (-V) @ 500 ms$^2$ | E1/2 (ergs/cm$^2$) | E7/8 (ergs/cm$^2$) | Vr (avg.) (-V) | λ max (nm) | Comments |
|---|---|---|---|---|---|---|
| 1 | 61.5 | 1.64 | 3.27 | 2 | 840/840 | 24 hr processing |
| 2 | 69.6 | 1.72 | 3.58 | 3 | 842/839 | 48 hr processing |
| 3 | 57.8 | 1.75 | 3.63 | 3 | 840/835 | 72 hr processing |
| Reference | 21.1 | 1.62 | 3.38 | 3 | 838/833 | Roll-Mill |
| Target Spec. | <35 | 1.53–1.84 | 2.95–4.19 | 0.56–6.34 | — | |

COMPARATIVE EXAMPLE IV

Conversion of HOGaPc Type I Polymorph to Type V Polymorph—Dynomill Bead Mill

This process for the conversion of hydroxygallium phthalocyanine from Type I to Type V polymorph was accomplished by forming a slurry by adding 1 weight parts Type I hydroxygallium phthalocyanine to 19 weight parts N,N-dimethylformamide (DMF) in a stainless steel vessel at room temperature, between 18° C. and 25° C., under an inert atmosphere of nitrogen. The slurry was then mixed from 0 to 96 hours to fully disperse the pigment in the DMF. Subsequently, the beads in the chamber were agitated by discs rotating at 2,000 rpm and the slurry was then pumped at a constant flow rate through the dynomill into a receiver vessel. The slurry was then pumped back to the mix vessel and the process was repeated to provide a range of milling residence times from 0 to 35 minutes. The resulting slurry containing the resulting Type V HOGaPc and DMF was isolated and purified as in Example I and provided an X-ray diffraction pattern having major peaks at Bragg angles at 7.4, 9.8, 12.4, 12.9, 16.2, 18.4, 21.9, 23.9, 25.0, and 28.1, with the highest peak at 7.4 degrees 2. THETA. (2 theta .+−. 0.2 degree).

Table 3 contains examples of electrophotographic properties of photoconductors prepared from the resulting Type V hydroxygallium phthalocyanine converted using dynomill bead mill processing.

TABLE 3

Type V HOGaPc Prepared With Dynomill Bead Mill.

| Comparative Sample | Dark Decay (−V) @ 500 ms² | $E_{1/2}$ (ergs/cm²) | $E_{7/8}$ (ergs/cm²) | Vr (avg.) (−V) | λ max (nm) | Comments |
|---|---|---|---|---|---|---|
| 1 | 12.9 | 1.78 | 3.92 | 10.75 | 846/845 | mix 24 hr, mill 0 hr |
| 2 | 12.3 | 1.64 | 3.58 | 5.22 | 845/846 | mix 96 hr, mill 0 hr |
| 3 | 10.6 | 1.63 | 3.57 | 5.35 | 845/846 | mix 96 hr, mill 7 min |
| 4 | 10.6 | 1.71 | 3.67 | 5.65 | 848/843 | mix 96 hr, mill 21 min |
| 5 | 9.8 | 1.65 | 3.63 | 8.92 | 846/846 | mix 96 hr, mill 35 min |
| Reference | 21.1 | 1.62 | 3.38 | 3 | 838/835 | Roll-Mill |
| Target Spec. | <35 | 1.53–1.84 | 2.95–4.19 | 0.56–6.34 | — | |

COMPARATIVE EXAMPLE V

Conversion of HOGaPc Type I Polymorph To Type V Polymorph—Alternative Impeller Mixing Means—45° Turbine This process for the conversion of Type I to Type V polymorph was accomplished by forming a slurry by adding 1 parts by weight Type I hydroxygallium phthalocyanine to 15.7 weight parts N,N-dimethylformamide (DMF) in a stainless steel vessel at room temperature, between 18° C. and 25° C., under an inert atmosphere of nitrogen. The slurry was then mixed with a 45° turbine 3-blade impeller, whose diameter is about 45 percent of the vessel's diameter, at a speed that provides a tip velocity of approximately 0.08 m/s, for 72 to 144 hours. The resulting slurry containing Type V HOGaPc and DMF was isolated and purified as in Example I. The isolated Type V hydroxygallium phthalocyanine polymorph has an X-ray diffraction pattern having major peaks at Bragg angles at 7.4, 9.8, 121.4, 12.9, 16.2, 18.4, 21.9, 23.9, 25.0, and 28.1, with the highest peak at 7.4 degrees 2.THETA. (2 theta .+−. 0.2 degree).

Table 4 contains examples of electrophotographic properties of photoconductors prepared from the resulting Type V hydroxygallium phthalocyanine converted using this process.

TABLE 4

Type V HOGaPc Polymorph Prepared by Alternative Impeller Mixing Means - 45° Turbine.,

| Comparative Sample | Dark Decay (−V) @ 500 ms² | E1/2 (ergs/cm²) | E7/8 (ergs/cm²) | Vr (avg.) (−V) | Comments |
|---|---|---|---|---|---|
| 1 | 21.8 | 1.85 | 4.20 | 18 | Turbine, 100 rpm, 72 hr |
| 2 | 18.7 | 1.90 | 4.36 | 19 | Turbine, 100 rpm, 144 hr |
| Reference | 21.1 | 1.62 | 3.38 | 3 | Roll-Mill |
| Target Spec. | <35 | 1.53–1.84 | 2.95–4.19 | 0.56–6.34 | |

Other modifications of the present invention may occur to one of ordinary skill in the art based upon a review of the present application and these modifications, including equivalents thereof, are intended to be included within the scope of the present invention.

What is claimed is:

1. A process comprising mixing a slurry of HOGaPc Type I polymorph under low shear and high flow in an organic solvent, wherein there results a HOGaPc Type V polymorph, wherein the mixing is accomplished at a mix speed which provides an anchor impeller tip velocity of from about 0.200 to about 0.300 meters per second.

2. A process in accordance with claim 1, wherein the mixing is accomplished under low shear of from about 20 seconds$^{-1}$ to about 30 seconds$^{-1}$, and high flow of from about 31% to about 46% of reactor volume per second.

3. A process in accordance with claim 1, wherein the mixing is accomplished in a mix tank wherein the ratio (D/T) of the impeller (D) diameter to the tank (T) diameter is about from about 0.8 to about 0.99.

4. A process in accordance with claim 1, wherein the mixing is accomplished with an anchor impeller type mixer element.

5. A process in accordance with claim 1, wherein the mixing is accomplished for from about 10 to about 120 hours.

6. A process in accordance with claim 1, wherein the mixing is accomplished for from about 90 to about 100 hours.

7. A process in accordance with claim 1, wherein the mixing is accomplished at about 0° C. to about 100° C.

8. A process in accordance with claim 1, wherein the electrical properties of the resulting HOGaPc Type V polymorph comprise an $E_{1/2}$ of from about 1.66 to about 1.71 ergs/cm²; an $E_{7/8}$ of from about 3.54 to about 3.64 ergs/cm²; a residual voltage of from about 3 to about 4 Volts; and a dark decay of from about 23 to about 25 Volts at 500 milliseconds squared.

9. A process in accordance with claim 1, wherein the slurry is comprised of from about 2 to about 10 weight percent HOGaPc Type I polymorph based on the combined weight of the Type I polymorph and the solvent.

10. A process in accordance with claim 1, wherein the slurry is comprised of from about 5.5 to about 6.5 weight percent based on the combined weight of the HOGaPc Type I polymorph and the solvent.

11. A process in accordance with claim 1, wherein the organic solvent is N,N-dimethylformamide (DMF).

12. A process in accordance with claim 1, wherein the organic solvent is selected from the group consisting of N,N-dimethylformamide, pyridine, dimethylsulfoxide, quinoline, 1-chloronaphthalene, N-methylpyrrolidone, and mixtures thereof.

13. A process in accordance with claim 1, further comprising washing the hydroxygallium Type V polymorph product with a solvent selected from the group consisting of acetone, an aliphatic alcohol with from 1 to about 25 carbon atoms, and mixtures thereof.

14. A process comprising: mixing with an anchor impeller a slurry of from about 5.5 to about 6.5 weight percent based on the total weight of the slurry of HOGaPc Type I polymorph in N,N-dimethylformamide, wherein there results a HOGaPc Type V polymorph, wherein the tip velocity of the anchor impeller is from about 0.2 to about 0.3 meters per second, wherein the mixing is accomplished in a mix tank wherein the ratio (D/T) of the impeller (D) diameter to the tank (T) diameter is about from about 0.9 to about 0.99, wherein the electrical properties of the resulting HOGaPc Type V polymorph comprise an $E_{1/2}$ of from about 1.66 to about 1.71 ergs/cm$^2$; an $E_{7/8}$ of from about 3.54 to about 3.64 ergslcm$^2$; a residual voltage of from about 3 to about 4 Volts; and a dark decay of from about 23 to about 25 Volts at 500 milliseconds squared.

15. A process in accordance with claim 14, wherein the resulting HOGaPc Type V polymorph product has major peaks at 7.4, 9.8, 12.4, 16.2, 17.6, 18.4, 21.9, 23.9, 25.0, 28.1 and with the highest peak at 7.4 degrees 2. THETA.

* * * * *